United States Patent
Oberg et al.

(10) Patent No.: US 7,136,583 B2
(45) Date of Patent: Nov. 14, 2006

(54) PROTECTION IN MIXED OPTICAL WDM SYSTEMS

(75) Inventors: Magnus Oberg, Hägersten (SE); Anders Lundberg, Åkersberga (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 581 days.

(21) Appl. No.: 10/168,991

(22) PCT Filed: Dec. 28, 2000

(86) PCT No.: PCT/SE00/02690
§ 371 (c)(1),
(2), (4) Date: Sep. 10, 2002

(87) PCT Pub. No.: WO01/48938
PCT Pub. Date: Jul. 5, 2001

(65) Prior Publication Data
US 2003/0077030 A1    Apr. 24, 2003

(30) Foreign Application Priority Data
Dec. 28, 1999  (EP) .................................. 99850219

(51) Int. Cl.
*H04J 14/00* (2006.01)
(52) U.S. Cl. ............................................. 398/5; 398/7
(58) Field of Classification Search .................. 398/5, 398/7; 370/227, 228, 216, 217, 221–223, 370/225
See application file for complete search history.

(56) References Cited

U.S. PATENT DOCUMENTS

| | | | |
|---|---|---|---|
| 5,982,517 | A | 11/1999 | Fishman |
| 6,046,832 | A | 4/2000 | Fishman |
| 6,122,082 | A | 9/2000 | Fishman |

OTHER PUBLICATIONS

Garavaglia et al, "A New Protocol for SDH-over-WDM Failure Propagation", Core Networks and Network Management, Amsterdam, IOS Press, NL.1999.

*Primary Examiner*—Dalzid Singh
(74) *Attorney, Agent, or Firm*—Nixon & Vanderhye, P.C.

(57) ABSTRACT

Devices (13.1, 31.1) communicate with each other on a wavelength channel using wavelength specific signals on a working WDM fiber (21) having a parallel protection WDM fiber (23). An SDH system (13.S, 31.S) uses one channel of the WDM system of the fibers as one of the fibers of the working pair of the SDH system and has a separate fiber (37) constituting that fiber of the protecting fiber pair for the SDH-system. To provide an unambiguous or predictable protection behaviour for the SDH system for the case of the working WDM fiber being cut the RETs (29.1, . . . , 29.S) have two modes. In the first mode a RET will be on and always carry traffic when the input power is high enough. In the second mode a RET they will not automatically turn on again after it has first lost the input signal and thereupon the input signal has returned. The RET can then be manually restarted or restarted after some suitable delay. Then the sequence of events will always be unambiguously defined. For a break of the working WDM fiber, the RET will loose its input signal, turn off, and will not immediately turn on again. Thereby there will always be enough time for the protection scheme of the SDH-system to be carried out. The SDH-system will thus automatically have a working protection path, i.e., the now working, former WDM protection fiber.

12 Claims, 3 Drawing Sheets

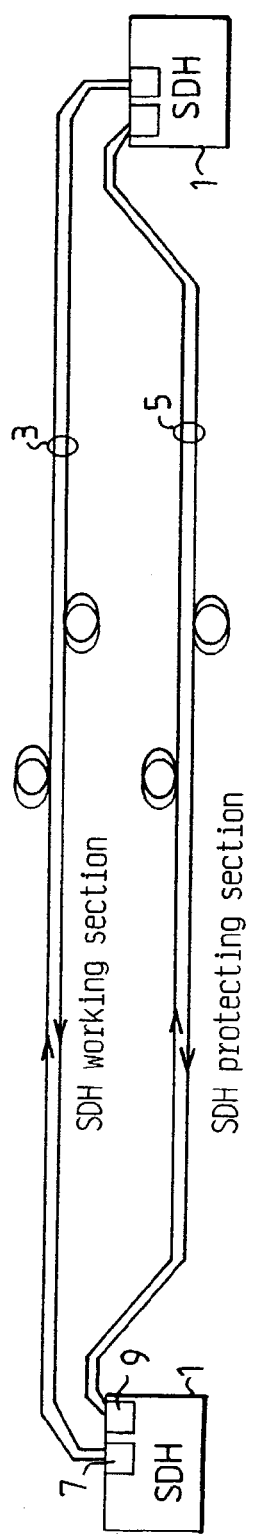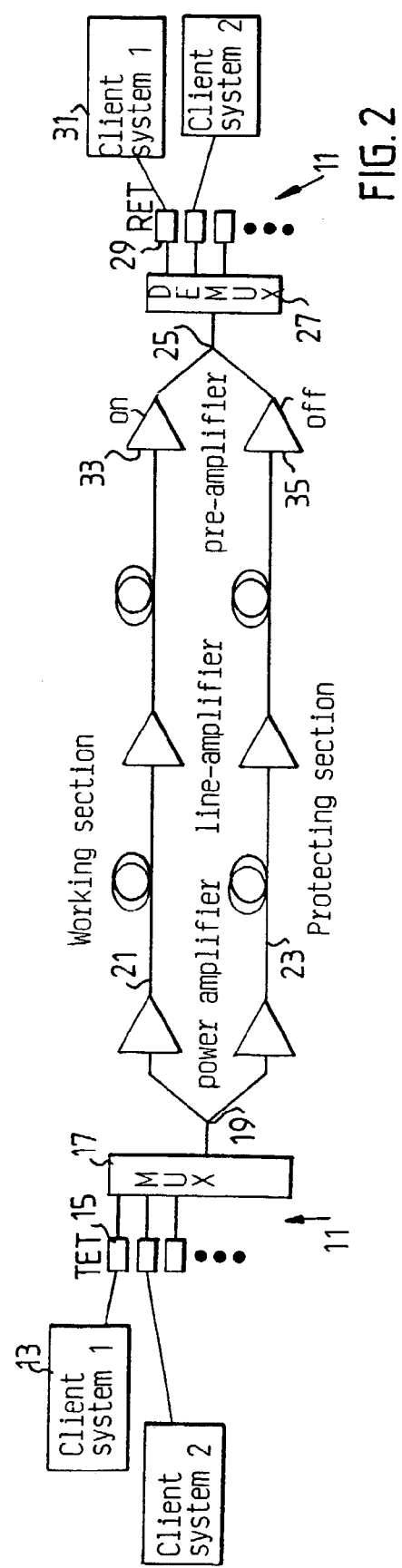

PROTECTION IN MIXED OPTICAL WDM SYSTEMS

This application is the U.S. National phase of international application PCT/SE00/02690 filed 28 Dec. 2000 which designates the U.S. PCT/SE00/02690 claims priority to EP Application No. 99850219.9 filed 28 Dec. 1999. The entire contents of these applications are incorporated herein by reference.

TECHNICAL FIELD

The present invention relates to protection in mixed optical WDM-systems.

BACKGROUND

In optical transmission systems different kind of protection functions are implemented in order to ensure a minimum of traffic loss. The important parts which are to be protected include for instance the optical transmission fibres.

One type of optically protected transmission system is the 1+1 MSP (Multiplex Section Protected) SDH (or SONET) point-to-point system. Such a protected SDH system comprises two pairs of optical fibres connecting two nodes 1, see FIG. 1. A first pair 3 is the working pair, one fibre of the pair normally carrying light signals in one direction and the other fibre of the pair carrying light signals propagating in the opposite direction. The second pair 5 is the protecting pair, the fibres of this pair normally carrying light signals which are not useful or at least are not used. In a protected SDH terminal multiplexer or node 1 two sets of optical receivers and transmitters are provided, one set 7 for the normally working fibre pair 3 and another set 9 for the protecting fibre pair 5. The transmitter in each set can always be active. The receiver of the set provided for the protecting pair is normally not active. In the case of a break of the fibres in the working pair an electric selector, not shown, decides to activate the receiver of the set for the protecting fibre pair and to deactivate the receiver of the set for the working pair. Thus the traffic is now communicated via the protecting fibre pair and the traffic is restored.

For wavelength division multiplexed (WDM) systems, one implementation of fibre protection is illustrated in the diagram FIG. 2. The system shown is an optical WDM point-to-point system having 1+1 optical multiplex section protection (1+1 OMSP). Only the optical fibres for carrying light signals in one direction between the nodes 11 are shown in FIG. 2, an identical system being used for traffic in the opposite direction.

From each client equipment 13 an optical signal goes to a transmit end transponder (TET) 15. The wavelength specific signal output from the TET 15 then goes to a multiplexer (MUX) 17 in which it is combined with the wavelength specific signals output from other transponders which receive input optical signals from the other client equipments. The signal output from the MUX 17 is the combined multichannel signal and it is split into two paths via a 1×2 fibre coupler 19, each split portion of the signal being transmitted on an own optical fibre of two optical fibres used in the considered direction between the nodes. The first optical fibre 21 is called the working optical fibre and carries the light signal which is normally used. The second optical fibre 23 is called the protecting optical fibre and normally the information possibly carried thereon is not used. The light signals carried by the two parallel optical fibres 21, 23 are combined into one light signal by a 2×1 fibre coupler 25 which thus has its two inputs connected to the fibres 21, 23. The combined signal output from the coupler 25 is provided to a WDM demultiplexer (DEMUX) 27 which splits the combined signal into the different wavelength channels corresponding the wavelength specific input signals to provide a different single channel on each of the outputs of the demultiplexer. Each output of the demultiplexer 27 is connected to an individual receive end transponder (RET) 29, which receives the wavelength specific signal and forwards it to a client receiver 31.

Normally the optical signals arrive to the RETs 29 via an active optical preamplifier 33 connected to the output end of the working fibre 21 and to an input of the combining coupler 25. The signals are also propagating in the protection path all the way to a preamplifier 35 connected to the output end of the protecting fibre 23 and to the other input of the combining coupler 25. This preamplifier 35 is normally turned off, thus blocking the signals on the protecting fibre 23 which thus do not reach the combining coupler 25 and the demultiplexer 27. This is necessary since otherwise a receiver 31 would have the same signals coming through both the working and protecting fibre paths 21, 23 with different delays, which would cause interference cross talk and bit-errors.

In the case of the working fibre 21 being broken, the light power input to the working preamplifier 33 connected to this fibre will be lost. This causes, by suitable control lines, not shown, the working preamplifier 33 to be turned off and the preamplifier 35 connected to the protecting fibre 23 to be turned on in order to restore the traffic which will then be transmitted on the protecting fibre 23.

The client systems 13, 31 connected via a WDM system are often different types. Also the quality of services required from these client systems might vary. One example of a little more complicated system is illustrated by the diagram of FIG. 3. In FIG. 3 is shown some kind of IP equipments 13.1, 31.1 which are connected as the client equipments 13, 31 in FIG. 2 and which communicate with each other on a wavelength channel using wavelength specific signals. A 1+1 MSP SDH system 13.S, 31.S uses one channel of the WDM system as one of the fibres of the working pair of the SDH system and has a separate fibre 37 constituting that fibre of the protecting fibre pair for the SDH-system which carries light signals in the same direction. Other client systems, not shown, can communicate on the remaining wavelength channels. In this example the IP system comprising the IP-equipments 13.1, 31.1 has no protection except for that provided by the 1+1 OMSP in the WDM system. The SDH system 13.S, 31.S has duplicated client transmitters and receivers connected by an extra fibre 37 outside the WDM fibres.

A problem associated with the SDH system in this configuration in the case of the working WDM fibre 21 being cut is that the behaviour of the SDH system then is unpredictable. When the working preamplifier 33 in the WDM system looses its input power (due to the fibre cut), it is turned off. The traffic into the SDH equipment at the receiver end is consequently lost and a switch over to the special SDH protection fibre 37 is triggered, provided that the detection is fast enough, but is not immediately carried out. In parallel, the OMSP on the WDM system is carried out and the protection pre-amplifier 35 is turned on. When the WDM signal comes back the RETs 29 restarts and the signal into the client systems 31.1 (31.2 . . . 31.S) is restored. For the IP equipment 13.1, 31.1 this is the desired behaviour, but the SDH system 13S, 31 .S typically has a relatively slow protection procedure and has probably not switched over to the SDH protection fibre 37 yet. The traffic will then come back for a moment and then the switch over to the SDH protection fibre 37 might or might not take place.

Differently termed, if the trigger for the SDH protection is faster than the WDM restoration, then the SDH system will switch over to the standby transmitters and receivers on the SDH protection fibre 37, and if the WDM restoration is faster than the trigger for the SDH protection then the SDH traffic will remain on the WDM system, now on the WDM protection fibre 23.

From an operator's planning point of view this unknown outcome of a protection event is highly undesirable.

BRIEF SUMMARY

It is an object of the invention to provide a method for achieving that protection events in a mixed communication system having at least two kinds of protection result in predictable states.

The problem solved by the invention is how a predetermined sequence of states can be obtained in a communication system having at least two different kinds of protection, in particular a system comprising two different types of networks, each having protection, one network using a communication link of the other network as a regular link, this link having protection in each of the networks.

Thus, the receive end transponders of FIG. 3 have two general states or modes. In the first general state a RET will always be on and carry traffic when the power input to the RET is high enough. For an interrupt in the WDM working fibre such as a fibre being cut the preamplifier connected to this fibre will turn off and consequently all the RETs will turn off. When the signals come back via the preamplifier on the protection side the RETs will immediately turn on again and the traffic is restored.

In the second general state of a receive end transponder it will not automatically or immediately turn on again after first the input signal of the RET has disappeared and thereupon the input signal has returned.

If a 1+1 MSP SDH (or SONET) system as illustrated in FIG. 3 is connected via an RET being in the general second state, there will always be a predetermined course of events for a fibre break on the working WDM fibre. The RET will loose its input signal, turn off, and will not turn on again, unless e.g. manually restarted. In this way there will always be sufficient time for the SDH protection scheme to be carried out. As an alternative to a manual restart the RET can have a delayed automatic restart so that it restarts after a predetermined delay period having a length selected so that after the delay it is quite certain that the SDH equipment have completed its SDH protection scheme. In this way the SDH-system will automatically have a working protection path, i.e. the now working, former WDM protection fibre.

In summary, only client systems having some type of fibre or equipment protection mechanism, not necessarily SDH/SONET 1+1 MSP, in addition to the one provided by the optical WDM fibre protection which is not necessarily 1+1 OMSP, shall have their RETs in this second "forced turn off" mode or "forced delayed turn on" mode. All other client equipment types shall use RETs in the first mode in which the RETs will always turn on immediately after an appropriate input signal is received.

BRIEF DESCRIPTION OF THE DRAWINGS

The invention will now be described by way of a non limiting embodiment with reference to the accompanying drawings, in which:

FIG. 1 is a schematic of an optically protected point-to-point SDH system,

FIG. 2 is a schematic, for one transmission direction, of an optical wavelength division multiplexed point-to-point system having 1+1 optical multiplex section protection.

DESCRIPTION OF A PREFERRED EMBODIMENT

Figure 3:
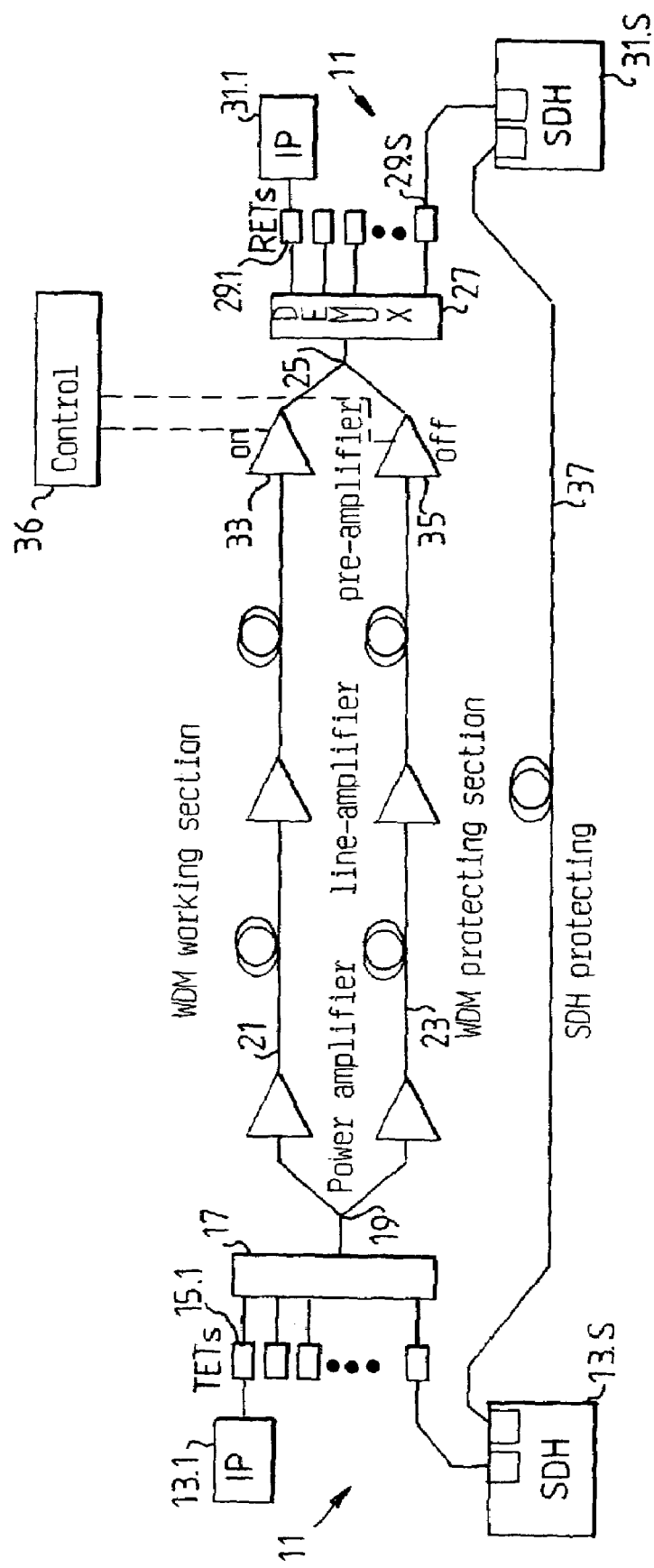
FIG. 3 is a schematic, for one transmission direction, of a protected optical wavelength division multiplexed point-to-point system in which one channel is used as the regular link of an optical point-to-point SDH system, the protection link being separate from wavelength division multiplex system.

In the system illustrated in FIG. 3 two nodes 11 are connected in a WDM system, only the optical fibres and other components for carrying light signals in one direction being shown. An identical system should be used for traffic in the opposite direction. From each client system or equipment 13.1, . . . an optical signal is issued to a respective transmit end transponder (TET) 15.1, . . . to produce an optical signal having a wavelength within a wavelength band specific to the channel selected for the client system 13.1, . . . The light signals produced by the TETs are received by a multiplexer (MUX) 17 in which they are combined to one light signal. The combined signal output from the MUX 17 is split into two light signals having substantially the same power by a coupler 19, each split light signal being transmitted on an own optical fibre. A first optical fibre 21 is called the working optical fibre and carries the light signal which is normally used. A second optical fibre 23 parallel to the first optical fibre is called the protecting optical fibre and the information normally carried thereon is not used. The two parallel optical fibres 21, 23 connect the two nodes 11, the nodes generally being located at some distance of each other. After propagating through the length of fibres 21, 23 the light signals arriving to the output end are combined into one light signal by a coupler 25 having its two inputs connected to the fibres 21, 23. The combined signal output from the coupler 25 is provided to a WDM demultiplexer (DEMUX) 27 in which the different wavelength channels corresponding the wavelength specific signals from the TETs 15.1, . . . are filtered out to provide a different single channel on each of the outputs of the demultiplexer. Each output of the demultiplexer 27 is connected to an individual receive end transponder (RET) 29.1, . . . , which receives the wavelength specific signal and forwards it to a client system or equipment 31.1, . . .

Optical preamplifiers 33, 35 are connected to the output end of the working and protecting fibres 21, 23 and to respective inputs of the combining coupler 25. The light signals carrying information all the time propagate along the two fibres and reach at least the preamplifiers. The working preamplifier 33 is normally turned on and the protecting preamplifier 35 is normally turned off, thus blocking the signals on the protecting fibre from reaching the combining coupler 25. This is necessary since otherwise a receiving client system 31.1, . . . would have the same signals corning through both the working and protecting paths with different delays, which would cause interference cross talk and bit-errors.

In the case of the working fibre 21 being broken, the light power input to the working preamplifier 33 connected to this fibre will be lost. This causes, by a suitable control such as a control unit 36 connected to the preamplifiers 33, 35, the working preamplifier 33 to be turned off and the preamplifier 35 connected to the protecting fibre 23 to be turned on in order to restore the traffic. The information reaching the client systems 31.1, . . . will then be carried by the light propagating along the protecting fibre 23.

One 13.S, 31.S of the client systems 13.1, . . . , 31.1, . . . at each node 11 is part of a 1+1 MSP SDH system and this system uses one channel of the WDM system as the working fibre included in the pair of fibres of the SDH system for transmission in one direction. These client systems 13.S, 31.S are also connected by a protecting fibre 37 separate from the WDM-network.

In the SDH system the behaviour is unpredictable in the case of the working WDM fibre 21 being broken. Thus, when the working preamplifier 33 in the WDM system looses its input power because no light can be transmitted to the far end of the fiber this preamplifier is turned off. The traffic received by the SDH equipment 31.S at the receiver end is consequently lost and the SDH system can trigger a switch over to the special SDH protection fibre 37, provided that the detection of lost traffic at the receiver end is fast enough. However, the switch over is not immediately made. In parallel to the detection of lost traffic by the SDH system, the switch of traffic to the protecting fibre 23 in the WDM system is carried out and the protection preamplifier 35 is turned on. When the WDM signal comes back the RETs 29.1, . . . restart and the signals to the client systems 31.1, . . . 31.S are restored. For the IP equipment 13.1, . . . this is the desired behaviour, but the SDH system 13.S, 31.S generally has a relatively slow protection scheme and has then probably not switched over to the SDH protection fibre 37 yet. The traffic will then come back for a moment and then the switch over to the SDH protection fibre 37 will probably be made.

Hence, if the detection of lost traffic and switching over in the SDH system is faster than the switching over to the protecting fibre 23 in the WDM system, the SDH system will switch over to standby transmitters and standby receivers connected to the SDH protection fibre 37. However, if the WDM restoration is faster than the detection and switching over in the SDH protection, the SDH traffic will at least for some short time period remain in the WDM system, now on the WDM protection fibre. Possibly the traffic will then be switched to the SDH protection fibre 37. Thus, the sequence of events for a protection condition is not predetermined which causes problems for e.g. system managers.

Figure 4:
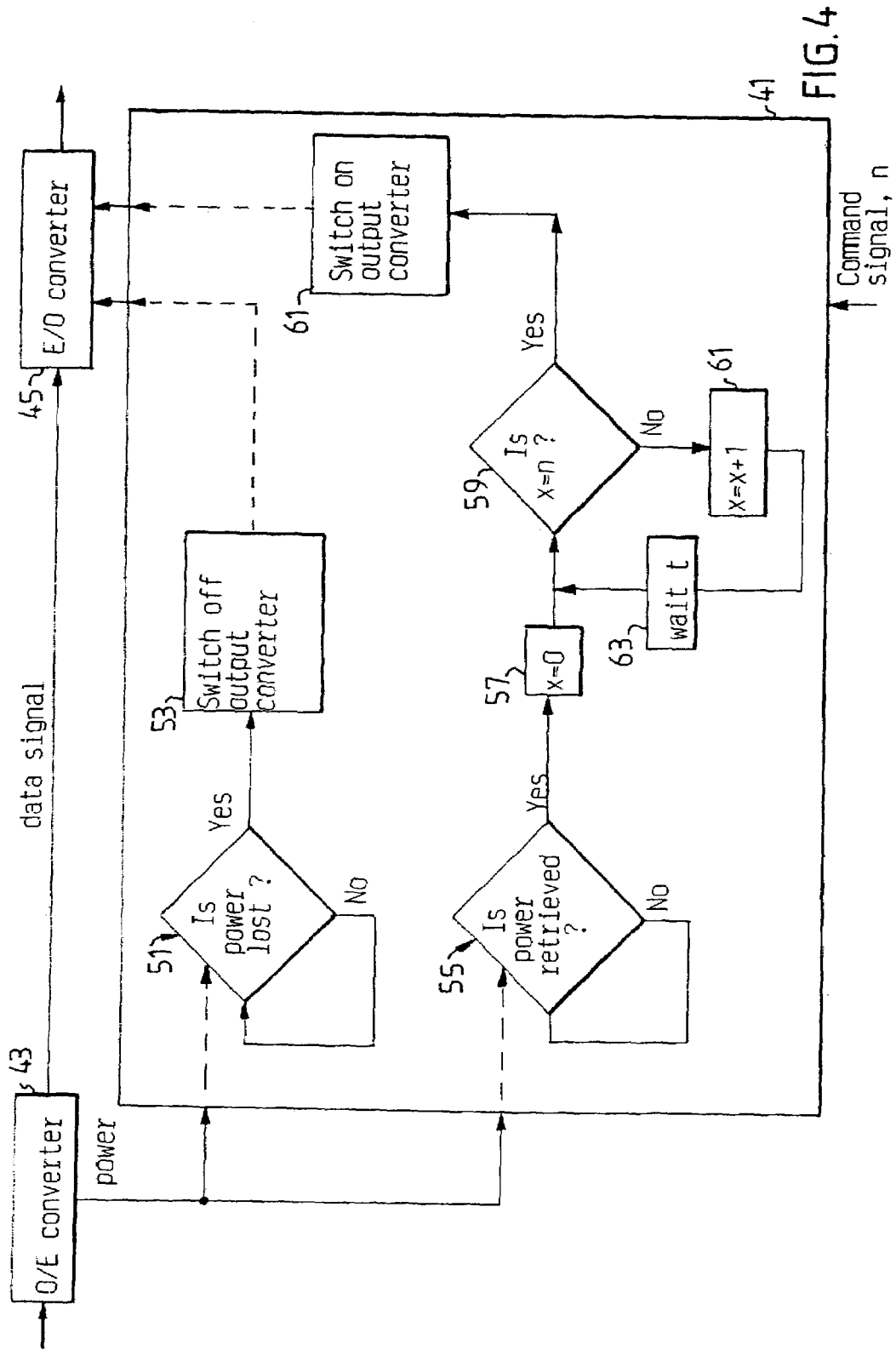
FIG. 4 is a block diagram of a modified transponder used in the system of FIG. 3.

At least the RET 29.S has a modified construction, see the diagram of FIG. 4, comprising two general states or modes, a first general state and a second general state. In the general first state the RET 29.S is turned on and always carries traffic when it receives input light having a power higher than some threshold value. This is the normal state, corresponding to the behaviour of prior art RETs. In the case of a break of the WDM working fibre the working preamplifier 33 will be turned off and consequently all the RETs 29.1 . . . 29.S will be turned off due to loss of power. When the signals come back via the protecting preamplifier 35 the RETs 29.1 . . . 29.S will immediately be turned on again and the traffic is restored. In the second general state a RET such as 29.S will not automatically turn on again once it has lost its input signal but will remain in the turned-off state until some control signal is received or as will be described hereinafter, until some predetermined time period has elapsed after the input signals of the RET have returned.

In the modified RET according to FIG. 4, an input command signal n is provided to a control block 41. The command signal can have integer values n=0, 1, 2, . . . provided e.g. from some administrative system or by a proper setting of jumpers, not shown. The value 0 signifies that the RET should operate in the conventional way, having no internal delay for restarting the transponder, and the values 1, 2, . . . signify that a delay of 1 predetermined time period, 2 predetermined time periods, . . . is introduced before switching on the transponder after detecting loss of power on the input of the transponder.

The transponder comprises in the conventional way an optoelectric converter 43, such as a PIN-diode, receiving the light input to the transponder and providing an electric output signal representing the power of the light arriving to the optoelectric converter. The electric output signal is fed to an electrooptic converter 45, such as laser having modulating facilities, providing on its output the output light signal of the transponder, the output light having wavelengths within a well-defined wavelength band.

The input converter 43 also provides an signal output to the control block 41, this signal indicating in some way the level of the power received by the input converter, e.g. as some average taken over some small time period, the time period being long enough to ensure that a not too small number of information bits should have been received when determining the average. The power level signal is provided to a wait block 51 in the control block 41, the wait block only responding when a loss of input power is detected. When such a loss is detected, a block 53 is executed in which a signal is sent to the output converter 45 to switch it off. The power level signal provided to the control block is also received by another wait block 55 in which the input power is also sensed. When this block detects that there is a sufficient power input to the transponder, i.e. the optoelectric converter 43, the procedure proceeds to a block 57 in which a variable or counter x is set equal to 0. Then it is tested in a block 59 whether the variable x is equal to the command signal n. If the test is positive, i.e. if x is equal to n, a block 61 is executed in which the output converter 45 is restarted. Thus, if n=0, the output converter will be immediately restarted. If the test in block 59 is negative, i.e. if x is found not to be equal to n, a block 63 is executed in which the variable x is incremented by 1. Then the procedure waits in a block 65 for a predetermined time period t after which the test block 59 is again executed.

What is claimed is:

1. A system for communicating information from a first node to a second node on a transmission link between the nodes, the transmission link comprising a first ordinary transmitting medium and a second protecting transmitting medium, the information being transmitted from the first node to the second node using the first medium, and further comprising a control unit for commanding, in the case of a failure of the first medium, to start to transmit the information from the first node to the second node using the second medium, the control unit arranged to have a first time period elapsing from detection of a failure of the first medium until starting to transmit the information using the second medium, a user network being connected to the nodes and using the transmission link as an ordinary user link between two stations of the user network, the user network having a separate protecting user link and switching, when no information is received from the ordinary user link, to start to transmit information instead on the protecting user link, a second time period elapsing from detection that no information is received until starting to transmit the information using the protecting user link, wherein the means for switching are arranged so that the first time period is larger than the second period.

2. The system according to claim 1, the first transmitting medium comprises an optical fiber carrying information in wavelength division multiplexed channels.

3. The system according to claim 2, wherein the second transmitting medium comprises an optical fiber carrying information in wavelength division multiplexed channels.

4. The system according to any of claims 2, wherein the user network comprises an SDH- or SONET-network using one of the wavelength division multiplexed channels as the ordinary user link.

5. The system according to claim 1, wherein the user network comprises an SDH- or SONET-network.

6. The system according to claim 1, further comprising preamplifiers connected in the first ordinary transmitting medium and the second protecting transmitting medium, the control unit connected to the preamplifiers to inactivate one preamplifier if there is no signal input to the preamplifier and then to activate the other preamplifier.

7. A system for communicating information from a first node to a second node, the system comprising:
   a transmission link between the nodes, the transmission link comprising a first ordinary transmitting medium and a second protecting transmitting medium, the information being transmitted from the first node to the second node using the first medium;
   a control unit for, in the case of a failure of the first medium, switching transmission of information from the first medium to the second medium;
   a user network connected to the nodes for using the transmission link as an ordinary user link between two stations of the user network, the user network having a separate protecting user link and being arranged, when no information is received from the ordinary user link, for switching transmission of information from the ordinary user link to the protecting user link;
   an end receiver transponder at the second node to the ordinary user link;
   an equipment unit connected at the second node both to the ordinary user link through the end receiver transponder and to the protecting user link;
   wherein the end receiver transponder is arranged, when no information is received by the end receiver transponder from the ordinary user link, to turn off and then wait a predetermined time before restarting receiving information on the ordinary user link, the predetermined time being selected to enable the user network to perform its switching.

8. The system according to claim 7, wherein the first transmitting medium comprises an optical fiber carrying information in wavelength division multiplexed channels.

9. The system according to claim 8, wherein the second transmitting medium comprises an optical fiber carrying information in wavelength division multiplexed channels.

10. The system according to claim 8, wherein the user network comprises an SDH- or SONET-network using one of the wavelength division multiplexed channels as the ordinary user link.

11. The system according to claim 7, wherein the user network comprises an SDH- or SONET-network.

12. A method of operating a communication system comprising:
   a transmission link for connecting a first node to a second node, the transmission link comprising a first ordinary transmitting medium and a second protecting transmitting medium;
   a user network being connected to the nodes and using the transmission link as an ordinary user link between two stations of the user network, the user network having a separate protecting user link and switching;
   the method comprising:
   transmitting information from the first node to the second node using the first medium and, in the case of a failure of the first medium, starting to transmit the information from the first node to the second node using the second medium, there being a first time period elapsing from detection of a failure of the first medium until starting to transmit the information using the second medium;
   when no information is received from the ordinary user link, starting to transmit information for the user network instead on the protecting user link, a second time period elapsing from detection that no information is received until starting to transmitting the information on the protecting user link;
   wherein the first time period is larger than the second period.

* * * * *